US006748225B1

(12) United States Patent
Kepler (10) Patent No.: US 6,748,225 B1
(45) Date of Patent: Jun. 8, 2004

(54) METHOD AND SYSTEM FOR THE DETERMINATION OF LOCATION BY RETAIL SIGNAGE AND OTHER READILY RECOGNIZABLE LANDMARKS

(75) Inventor: Michael A. Kepler, Aloha, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 0 days.

(21) Appl. No.: 09/514,971

(22) Filed: Feb. 29, 2000

(51) Int. Cl.[7] .................................................. H04Q 7/20
(52) U.S. Cl. .................................. 455/456.2; 455/456.1
(58) Field of Search ................................. 455/456, 414, 455/457, 414.1–414.4, 456.1–456.6; 342/357.09, 357.01–357.04, 450, 457; 340/905; 701/201, 208, 209; 707/100

(56) References Cited

U.S. PATENT DOCUMENTS

| 5,625,668 | A | * | 4/1997 | Loomis et al. ................. 379/58 |
| 5,758,313 | A | * | 5/1998 | Shah et al. .................. 701/208 |
| 6,029,069 | A | * | 2/2000 | Takaki ......................... 455/456 |
| 6,119,013 | A | * | 9/2000 | Maloney et al. ............. 455/456 |
| 6,131,028 | A | * | 10/2000 | Whitington .................. 455/435 |
| 6,252,544 | B1 | * | 6/2001 | Hoffberg ................. 342/357.1 |
| 6,256,503 | B1 | * | 7/2001 | Stephen ...................... 455/456 |
| 6,295,454 | B1 | * | 9/2001 | Havinis et al. ............. 455/456 |
| 6,304,758 | B1 | * | 10/2001 | Iierbig et al. ............... 455/456 |
| 6,311,069 | B1 | * | 10/2001 | Havinis et al. ............. 455/456 |
| 6,314,365 | B1 | * | 11/2001 | Smith ......................... 701/200 |
| 6,323,805 | B1 | * | 11/2001 | Zou et al. .................... 342/357 |
| 6,377,810 | B1 | * | 4/2002 | Geiger et al. ............... 455/456 |
| 6,400,956 | B1 | * | 6/2002 | Richton ...................... 455/456 |
| 6,463,288 | B1 | * | 10/2002 | Havinis et al. ............. 455/456 |
| 6,522,889 | B1 | * | 2/2003 | Aarnio ........................ 455/456 |

* cited by examiner

Primary Examiner—Jean Gelin
(74) Attorney, Agent, or Firm—Kaye Scholer LLP (57) ABSTRACT

A system and method for determining a current location by the visual identification of retail signage and other readily recognizable landmarks comprising a service center having one or more service agents, a plurality of inbound communication channels allowing the service center to receive a communication from a lost traveler or a traveler unfamiliar with the particular locale, a switch platform in the service center directing the communication received from the traveler to one of the one or more service agents. The lost traveler identifies for the service agent one or more of landmarks the traveler sees proximate to the traveler's current location. A database is maintained which includes a plurality of records corresponding to the geographic location information for a plurality of landmarks in a given region. A host computer executes a search of the database for the one or more landmarks visually identified by the traveler. The host computer attempts to determine the current geographic location from a search of the database. If successful, the service provider provides to the traveler an indication of the traveler's current location.

20 Claims, 6 Drawing Sheets

METHOD AND SYSTEM FOR THE DETERMINATION OF LOCATION BY RETAIL SIGNAGE AND OTHER READILY RECOGNIZABLE LANDMARKS

BACKGROUND OF THE INVENTION

1. Field of Invention

The present invention relates to a method and system for determining a geographic location. More particularly, the present invention involves the identification of a current geographic location by recognition of retail signage and other readily recognizable displays.

2. Discussion of the Related Art

The ability to obtain reasonably accurate driving directions has dramatically improved in recent years with the advent and availability of a number of online mapping site on the internet. These mapping sites, such as MapQuest and MapBlast, receive and process millions of requests for directions a month. These sites have become hugely popular, in large part, because of their simplicity of use. A user is able to simply type in a starting point and a destination, either within a city or across states. Using the starting point and destination, these map sites produce a map with the route highlighted, along with precise turn-by-turn directions. The directions typically include estimates how much time the trip will take and how many tenths of a mile are in each leg of the trip. These mapping sites typically do not charge for their services.

The maps used on these mapping sites are compiled from a plurality of sources of data, including U.S. Geological Survey topographical charts, aerial photographs of roads, U.S. Postal Service delivery maps and local government data. This information is compiled to create a draft map, complete with street names and addresses. Then, roads are physically inspected to ensure the accuracy of the maps. The maps are checked for one-way streets and restricted-access roads. In addition, signs on highway ramps are photographed. The completed maps are stored in a centralized database and maintained with the latest information.

To plot a driving route, the computer(s) at these mapping sites calculate the longitude and latitude of the starting point and destination. The computer(s) generates driving directions between the starting point and destination by essentially connecting the dots.

The driving directions provided by these online mapping sites have their limitations. The driving directions are typically generated either in a written form (for example, on a printout of the map from an attached printer) or displayed on a computer screen or personal, hand-held device (such as a PalmPilot or other PDA). Such "readable" directions are incongruous with the notion of driving an automobile with both hands on the wheel and both eyes on the road.

The present assignee has redressed certain of these difficulties by providing a directory assistance service that reduces the need to have directions provided in a "readable" form. For example, in co-pending U.S. patent application Ser. No. 09/054,360 and U.S. Pat. No. 5,737,700, both of which are incorporated herein by reference, systems are described in which directions are voiced to travelers over a wireless telephone by a service agent (e.g., an operator or a voice response unit ("VRU")). A traveler using a wireless telephone connects through a wireless switching office to a directory assistance center. The traveler is connected to a directory assistance agent and specifies a desired destination. The traveler's present position or origination point is determined. A routing algorithm (similar to the ones utilized by the online mapping sites) determines an appropriate route from the caller's present position or origination point to the destination location.

The traveler may remain connected to the directory assistance center for the duration of the trip or disconnect and reconnect as necessary or as desired. When connected to the directory assistance center, the traveler may request an operator or other service agent to provide directions along the chosen route. Depending on the length or complexity of the chosen route, it may be divided into multiple segments, with directions being provided by an operator to the traveler for each segment as the traveler proceeds along the route.

A further limitation of the driving directions provided by these online mapping sites is their failure to address the fundamental fact that a traveler, by requesting directions, is conceding a lack of familiarity with the layout and interconnectivity of the streets and roads of a particular locale. The traveler would not need directions if he/she was familiar with all of the streets and roads, and how they interconnect. The driving directions provided by the mapping algorithms attempt to address this problem by providing specific and detailed turn-by-turn directions to the traveler. These turn-by-turn directions are augmented with the distances (down to the tenths of miles) to be traveled on each road. Using the odometer and street signs, it is hoped that the traveler gets from point A to point B with little difficulty.

Such a solution is not entirely satisfactory. The solution demands that the traveler know where his/her origination point ("Point A") is so it can be provided to the mapping algorithm. Where the traveler is beginning at a known location such as a residence or a workplace, this does not present much difficulty. However, when the traveler is in a new city or has gotten lost, determination of the origination point becomes a significant obstacle. The expression, "if I knew where I was, then I would not be lost" carries particular relevance.

Thus, there is a need for a method and system which helps a traveler who is in unfamiliar territory or who has gotten lost in his/her travel to determine where he/she is at that particular moment in time. Such a method and system would attempt to maximize the time a traveler's eyes remain focused on the road. Such a system would also advantageously free or reduce the burden on the traveler to search for and find unfamiliar and imperceptible street signs. Such a system would also reduce the burden on the traveler to scan the dashboard of his/her car for the odometer. Such a system should also present the advantage of using illuminated and easily recognizable sign that would alleviate the demands of driving at night or during harsh weather conditions.

SUMMARY OF INVENTION

Accordingly, it is an object of the present invention to provide a method and system to allow a traveler to use retail signage or other readily-recognizable landmarks to determine a current location. The use of retail signage or other readily-recognizable landmarks allows a traveler unaccustomed with local streets or unable to see street signs (because of darkness or weather conditions) to determine a current location with relative ease.

It is another object of the present invention to provide feedback to the customer in the form of other retail signage or readily-recognizable landmarks in the vicinity of or proximate to the traveler's determined location. This will allow the system to verify that the determined location is in fact the current location of the traveler.

It is a further object of the present invention to provide a customer turn-by-turn directions from a current location determined in accordance with the present invention to a desired destination location. The capability to provide directions from a current location to a desired destination location allows a lost traveler the ability to both determine a current location as well as obtain directions to a destination location in fewer interactions.

These and other objects are achieved by the present invention which includes a system and method for determining a current location by the visual identification of retail signage and other readily-recognizable landmarks. The system and method comprise a service center having one or more service agents (which are understood to include both interactive voice response systems (IVRs) as well as human operators acting alone or in combination with voice response units (VRUs) and IVRs). A plurality of inbound communication channels allow the service center to receive a communication (typically, in the form of a wireless telephone call) from a lost traveler or a traveler unfamiliar with the particular locale. A switch platform in the service center directs the communication received from the traveler over one of the plurality of inbound channels to one of the one or more service agents. The lost traveler identifies for the service agent one or more landmarks the traveler sees proximate to the traveler's current location. A database is maintained in the service center or in a centralized information hub. The database includes a plurality of records corresponding to the geographic location information for a plurality of landmarks in a given region. A host computer (which may include or work in combination with a database server) is capable of executing a search of the database for the one or more landmarks visually identified by the traveler. The host computer attempts to determine the current geographic location from a search of the database. If successful, the service provider provides to the traveler an indication of the traveler's current location.

If the system is unable to identify a current location for the traveler, the service provider seeks to obtain additional geographic information about the current location from the traveler. The traveler is asked to identify any additional landmarks in the vicinity of the current location. If there are no readily identifiable landmarks in the immediate vicinity, the traveler can continue on his/her route and reconnect with an operator when a landmark is encountered. The host computer augments its search with the additional geographic information and re-attempts to determine the current location.

After the current geographic location of the traveler is determined, the service provider obtains an indication of a destination of the traveler. The host computer, working in cooperation with a second database containing geographic mapping information, determines a route for the traveler to get from the current location to the destination location. The service provider provides at least a portion of the determined route to the traveler.

BRIEF DESCRIPTION OF THE DRAWINGS

The features and advantages of the present invention will be better understood by reference to the following detailed description, which should be read in conjunction with the accompanying drawings in which.

DETAILED DESCRIPTION OF THE INVENTION

The following embodiments of the present invention will be described in the illustrative context of a directory assistance center capable of providing directory assistance and enhanced directory assistance services, including travel services, restaurant and movie services, and directions services. Those skilled in the art, however, will recognize that the disclosed methods and structures are readily adaptable for broader applications.

Figure 1:
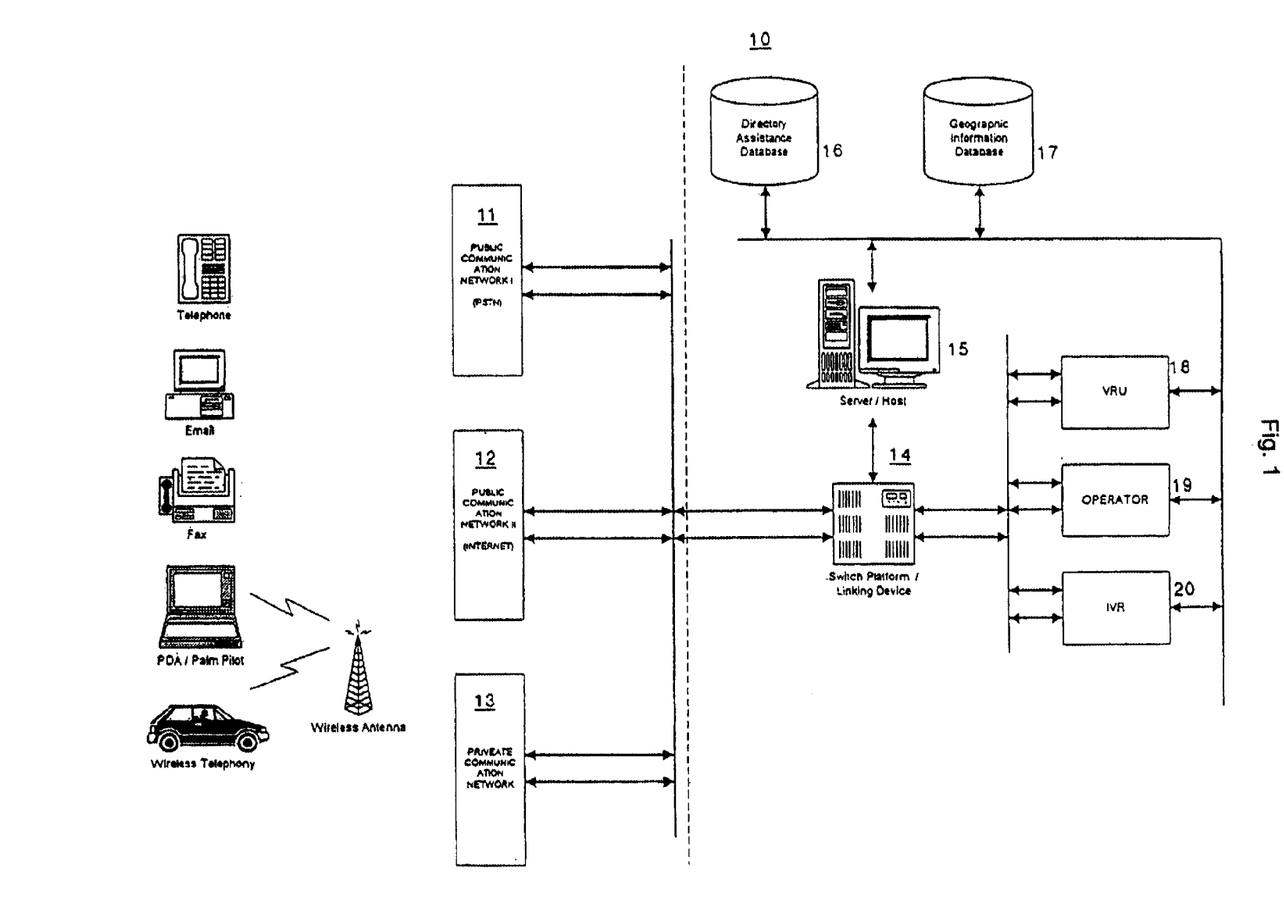
FIG. 1 is a block diagram of a communications system in which the principles of the invention may be practiced.

With reference to FIG. 1, a mobile or ambulatory user (hereinafter referred to as the "traveler") in a first location uses a communication device such as a wireless telephone or personal digital assistant (such as a Palm Pilot™ or similar hand-held device) to connect to a service center providing a plurality of enhanced directory assistance. It understood that with the ever-expanding capabilities of wireless devices, many types of digital messaging (e.g., email, fax, wireless telephony, paging, WPA) may be used to communicate. All of the these technologies come within the ambit of the present invention.

The traveler may connect to the service center over one of many telecommunications networks. Different types of telecommunications networks are well know in the art. As illustrated on FIG. 1, the networks include a public switched telephone network (PSTN) 11, a publicly accessible wide area network such as the world wide web or internet 12. With the advent of protocol such as voice over IP, telephony over the internet is becoming more and more common. In addition, the traveler may connect to the service center of a private communication network 13.

The communication is routed over one or more of the communication networks 11, 12, 13 to the service center 10. At the service center 10, the communication is connected to a switch platform 14. From the switch platform 14, the communication is connected to a service provider. A service provider as used herein includes without limitation VRUs 18, human operators 19 such as directory assistance providers as well as operators specially-trained to provide assistance with directions, and interactive voice response systems (IVRs). A service provider may also include a human operator working in conjunction with a VRU and IVR. For example, a IVR may be used to play greeting and closing messages as well as obtain preliminary information from the traveler such as the city, state, street on which the traveler is currently located and the particular direction the traveler is currently traveling. This information is provided to the human operator 19. A service provider may also includes two or more human operators working together. As is described in co-pending U.S. patent application Ser. No. 09/054,360, a pointer or reference is maintained to any database record accessed in conjunction with the handling of a communication from a user. Thus, when a user reconnects to a service agent after being placed on hold or after disconnecting for a period of time, a placeholder exists which will allow a subsequent service provider to pick up where the last service provider left off.

A plurality of databases are maintained by the system. Database 17 is similar to the databases that are commercially licensed by the online mapping sites such as MapQuest and MapBlast. They contain geographic coordinate information which allows the identification of any point (address) in the mapping system based on a specification of a longitude and latitude. As explained in greater detail below, the system uses database 17 to pin-point the current location of the traveler as well as determine for the traveler a route from the traveler's current location to a desire destination.

Database 16 contains records for the hundreds of thousands of different residences, business establishments, museums, ball parks, fire and police stations, government offices, airports and other identifiable structures in a particular region or locale. Database 16 may also include records for other identifiable landmarks in the region such as street and highway signs, traffic lights, statutes, parks, beaches, tunnels and bridges. Anything that a traveler may readily recognize and identify, typically through visual means, is understood to be included as a landmark.

Each record comprises, to the extent applicable, a telephone number, address, certain descriptive information, and specific geographic coordinates, such as the latitude and longitude. The geographic coordinates of the landmarks are used by the system to pin point the current location of the traveler. As explained in greater detail below, the host computer 15 executes a search of directory database 16 using information provided by the traveler, such as locale information (city, county, state) as well as an identification of one or more visually identifiable landmarks proximate to the traveler's current location. The search attempts to identify the record in the database 16 corresponding to the one or more visually identifiable landmarks identified by the traveler. If the search is successful, the search returns the geographic coordinates of the identified landmarks. The host computer 15 uses this geographic coordinates returned by the search to execute a search of the geographic database 17 to pin-point the exact current location of the traveler.

As illustrated in FIG. 1, the databases may be maintained at one or more service centers. In an alternative embodiment, the databases may be centrally located at an information hub and accessible over a wide area network. It is understood that databases 16 and 17 may also reside on the same physical structure.

Figure 2:
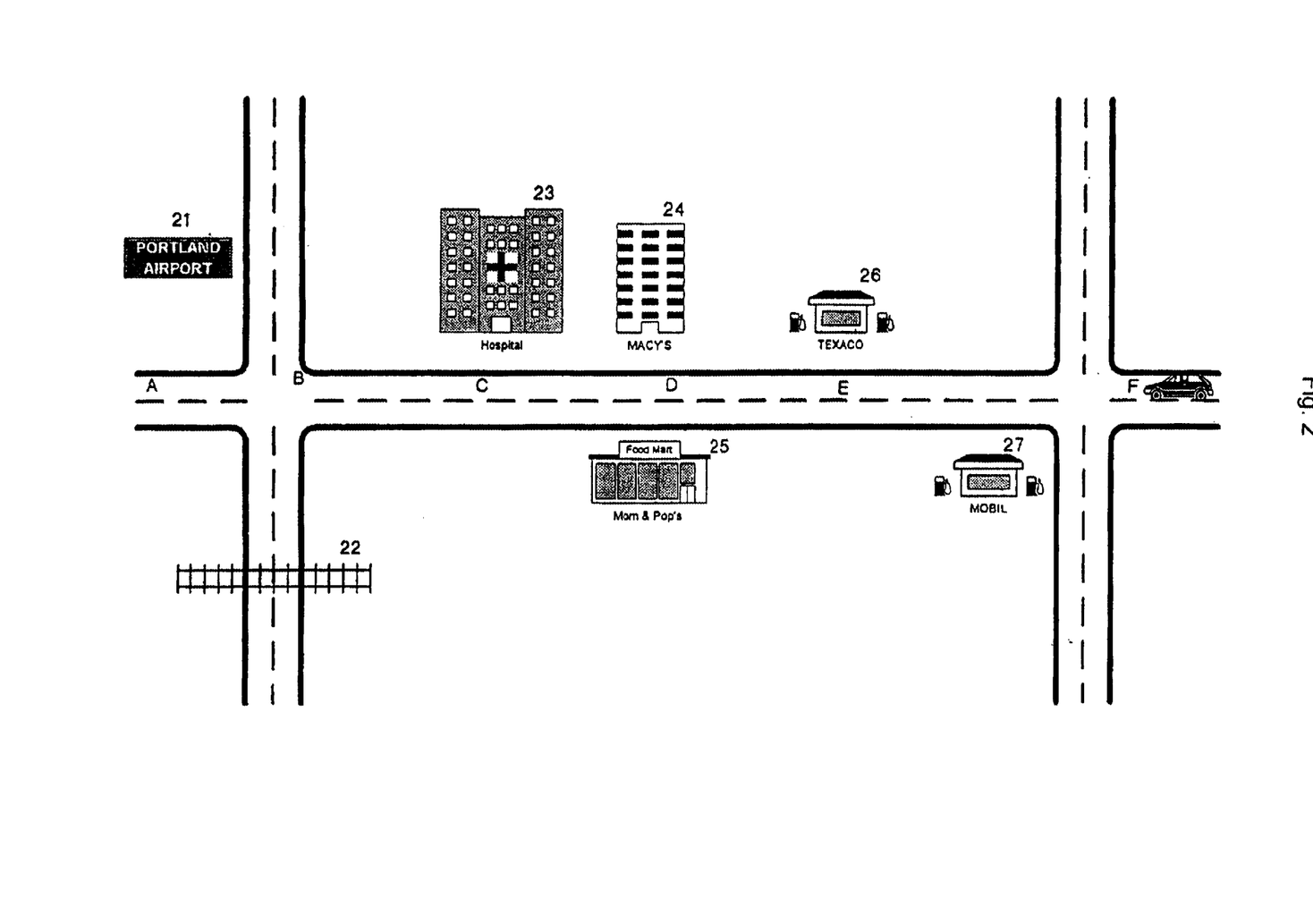
FIG. 2 provides an illustrative example which demonstrates the principles of the invention.

FIG. 2 provides illustrative examples which demonstrate the principles of the present invention. A traveler traveling in a car may encounter a number of situations in which the present invention has particular application. Reference is made to the examples provided in FIG. 2 in connection with the description of the operation of the system provided in FIGS. 3–6.

Figure 3:
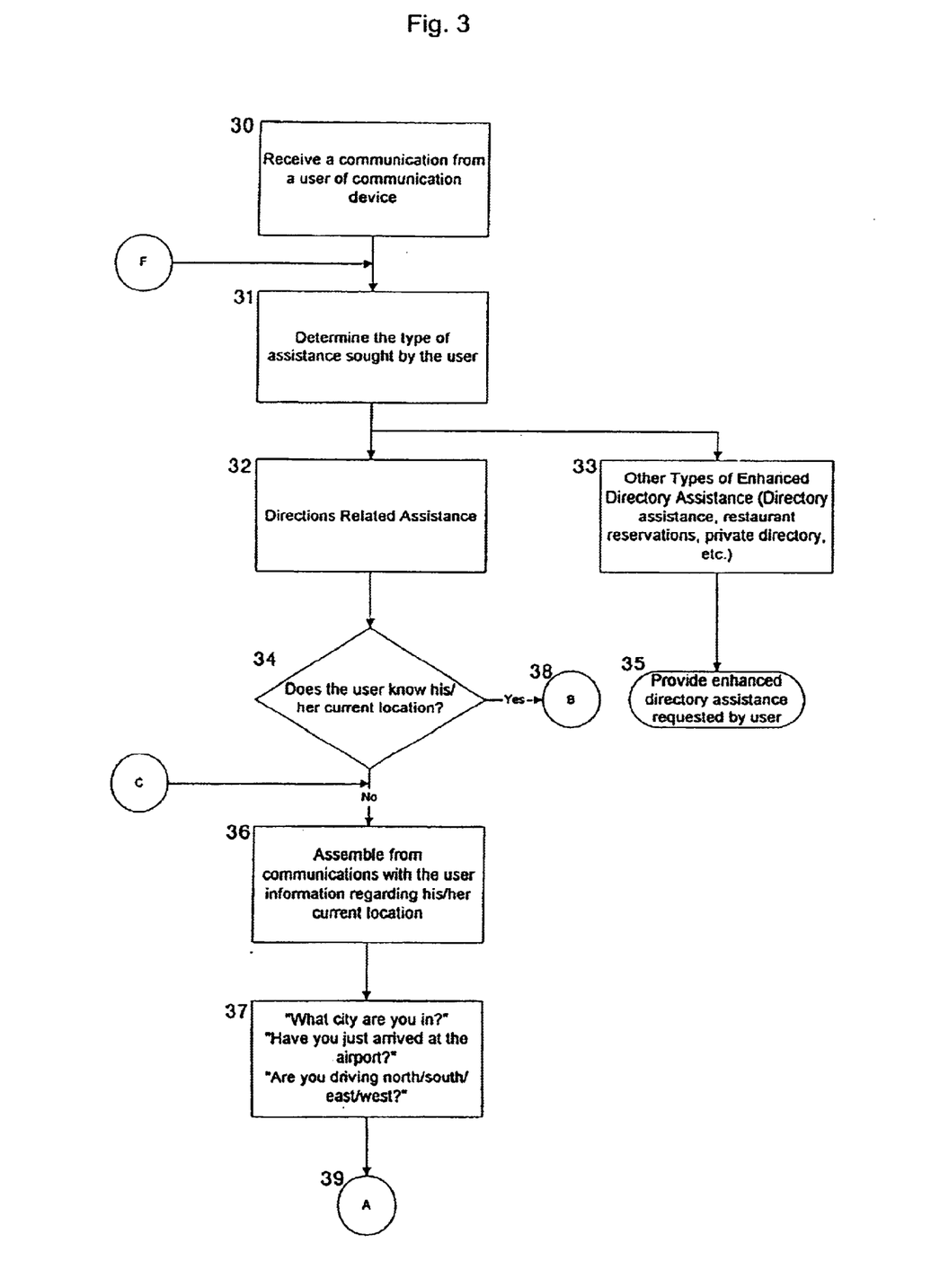
FIGS. 3–6 are flow charts which describe the operation of the invention in the system of FIG. 1.

Referring to FIG. 3, a communication is received at the service center from a user using a communication devices such as a wireless telephone, PDA, pagers or other electronic communications device (step 30). The system may provide via VRU 18 a greeting message to the user welcoming him/her into the system. The system typically then connects the user to a service provider (human operator) to determine the type of services required by the user (step 31). In an alternative embodiment, an IVR may provide the user with a series of menus having selectable options which provide an automated method for the system to channel user requests to appropriate service providers.

After it is determined that the user requires directions-related assistance (step 32), a service provider inquires as to the type of directions-related assistance is desired. In the instance in which the user knows his/her current location and simply wants turn by turn directions to a desired destination, the system branches (step 38) to FIG. 5. The service provider receives from the user an indication of the user's intended destination (step 57). The system uses the user's known current location and the desired destination to generate turn-by-turn directions using database 17 (step 58).

Figure 5:
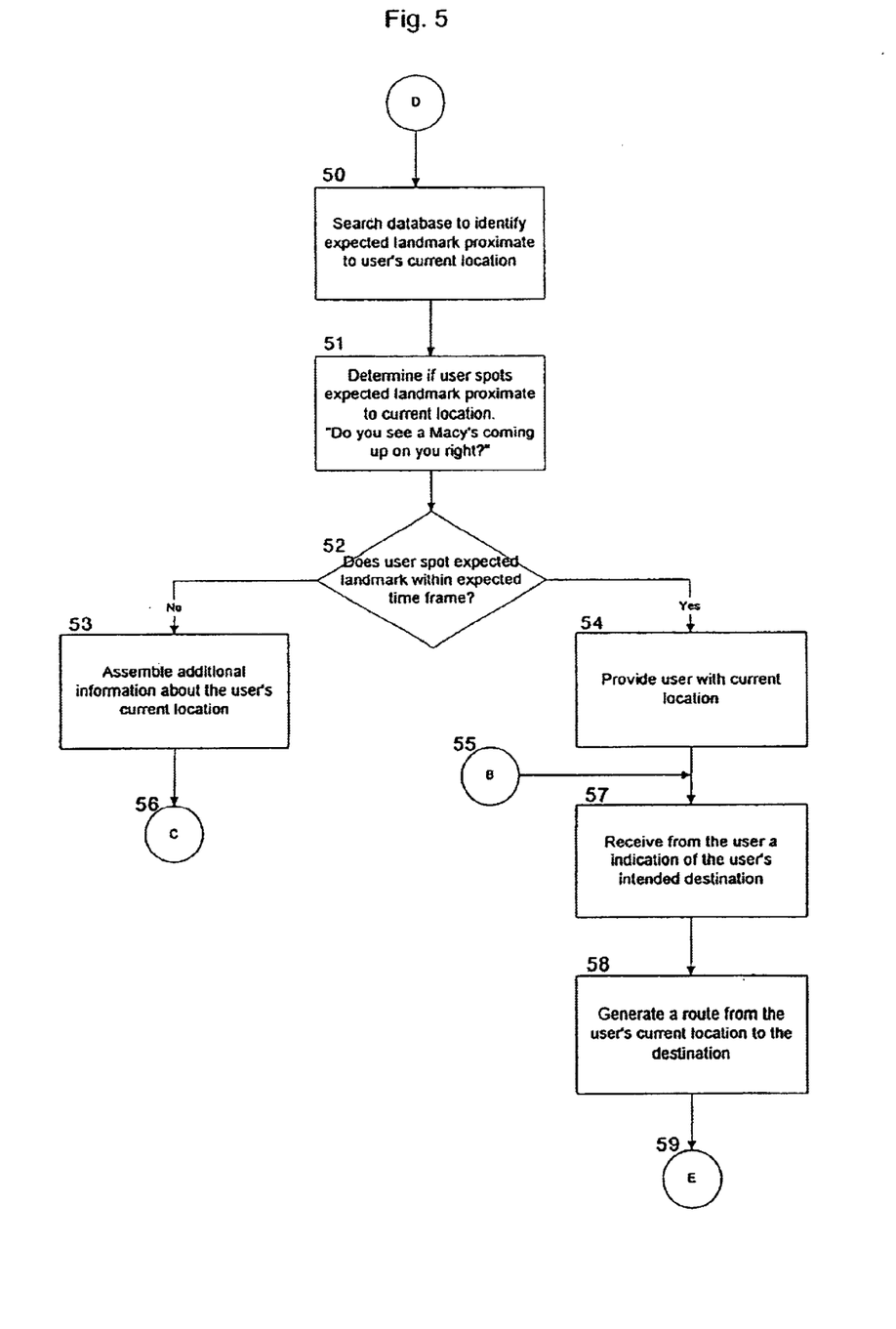
Figure 6:
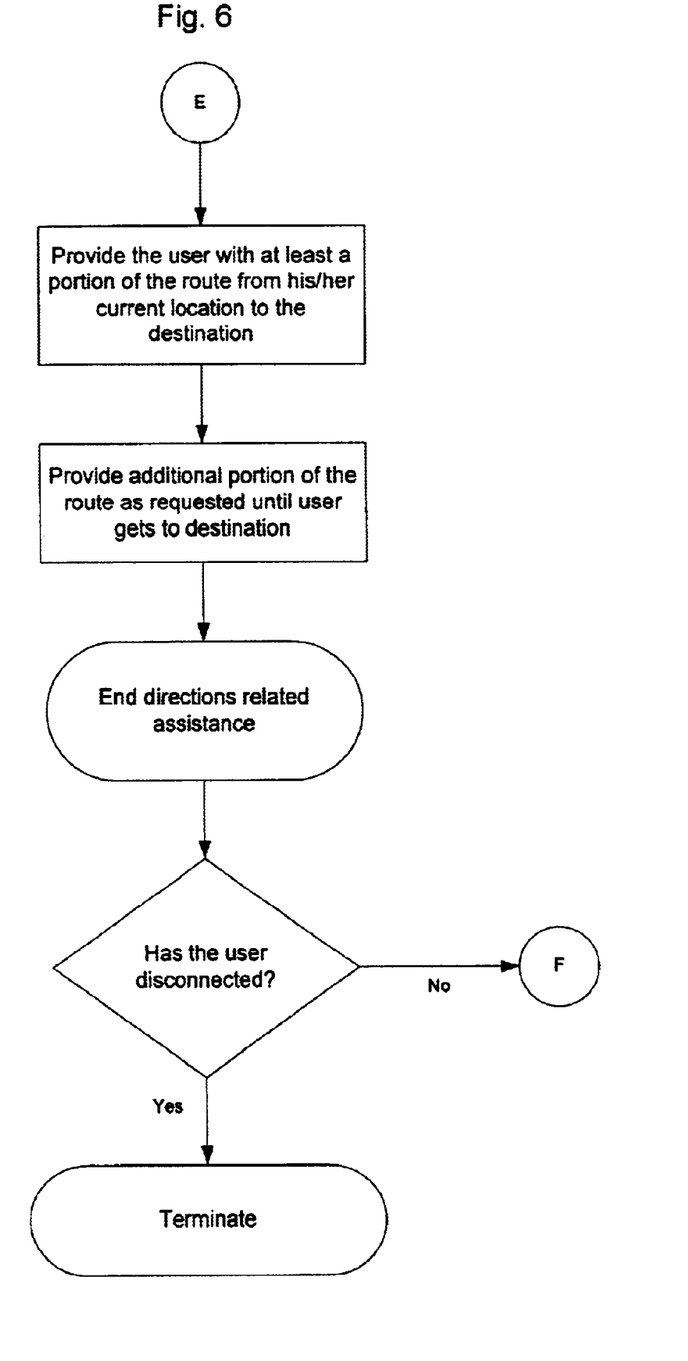

In the instance in which the users does not know his/her current location, the service provider, through a series of questions and answers, attempts to assemble as much information about the user's current location as possible (step 36). Inquiries are made regarding what city and state the user is currently traveling in. Inquiries are also made regarding the user's current heading (north/south/east/west). If the user is unable to identify the current heading, inquiries are made into the position of the sun (if visible) relative to the current driving direction. Other inquiries may be made, such as whether the user has just arrived at an airport and the name and kind of road being traveled (highway, street, country road) (step 37).

Figure 4:
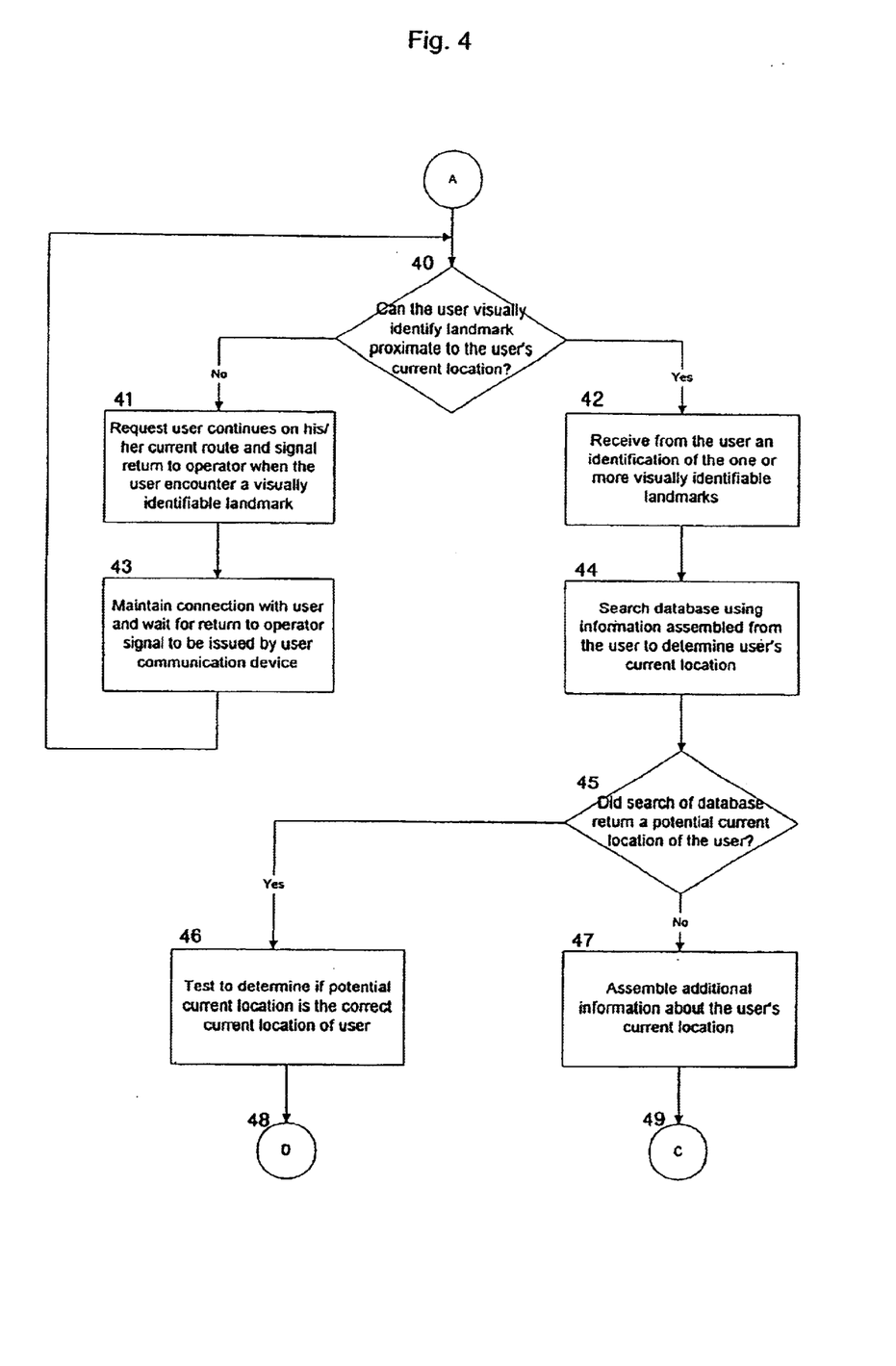

Next, as shown on FIG. 4, the service provider inquires into whether the user is able to visually identify any landmarks proximate to the user's current location (step 40). Referring to FIG. 2, suppose the traveler is at point A where there are no visually identifiable landmarks. The user would respond to the service provider's inquiry that he/she is unable to visually identify any landmarks proximate to the current location. The service provider would request the user to continue on his/her current route, place the call in a wait or hold state, and wait for a return to operator signal (StarBack®) to be issued by the user when the user encounters a visually identifiable landmark (steps 41 and 43). The return to operator feature is described in U.S. Pat. No. 5,797,092 issued on Aug. 18, 1998 to Metro One Telecommunications, the assignee of the present application.

As the traveler continues on the route, the traveler will eventually approach point C. At point C, the user visually identifies Hospital 23. The user uses the return to operator feature to recall a service provider. The service provider may be the same service provider previously connected to the user or may be a different service provider. Because the system maintains a pointer to previous transactions between the user and the service center, the system presents to the recalled service provider (regardless of whether it was the previously connected service provider or a different service provider), in an accessible manner, the previously assembled information about the user at steps 36 and 37.

The user, when reconnected to the service provider, identifies the landmark, in this instance, Hospital 23 (step 42). The service provider uses the previously assembled information about the user (city, state, street, heading direction) together with the landmark (Hospital 23) to search database 16 to identify specific geographic coordinates of the user. It is understood that in certain situations, an identification of the landmark alone is sufficient to generated the specific geographic coordinates. For example, the identification of Yankee Stadium, the White House or the Universal Studios as a landmark will return the specific geographic coordinates without further specification of city and state.

The host computer 15 executes a search of database 16 (step 45). Using the specific name of Hospital 23, a search of database 16 will return the address of Hospital 23 as well as the latitude and longitude of Hospital 23. Host 15 searches database 17 with the geographic coordinates of Hospital 23 returned by the search of database 16. The search of database 17 pin-points the current location of the user. In a preferred embodiment, host 15 will generate a graphical representation of the map of the locale where the traveler is currently located. Host 15 will cause this graphical representation of the map to appear on the screen of the service provider. If the traveler has a communication device with a capable graphical interface, Host 15 will cause the graphical representation of the map to be transmitted over one of the telecommunications networks to the user's communication device so it may be displayed to the traveler.

To confirm that the user is in the location identified by the system, a landmark adjacent to the landmark identified by the user is located (step 53). The adjacent landmark is located by a routine executed on host 15. The routine searches database 17 to return the geographic coordinates of the road ahead of the traveler's current location. The routine uses these geographic coordinates to search database 16 to identify one or more landmarks located on the road ahead of the traveler (step 50). Referring again to FIG. 2, the routine would return the Macy's Department store 24. The service provider voices to the traveler "Do you see a Macy's coming up on your left hand side?" (step 51). If the traveler spots Macy's, then the system is assured that it has the traveler's correct current location and heading.

If the search of the databases at step 45 fails to return a potential current location of the user or the traveler never spots the expected landmark (i.e., Macy's)(step 52) the system attempts to assemble addition information about the user's current location (steps 47 and 53). With the addition information, the system re-attempts to identify the traveler's correct current location and heading.

Once if is determined that the traveler's correct current location and heading is determined, the service provider audibly communicates the information to the traveler (step 54). The service provider may obtain from the user an indication of the user's intended destination (step 57). Using database 17, the system generates a travel route from the user's current location to the intended destination (step 58). Directions according the travel route may be provided to the user by the service agent all at one or may be segmented, with each segment provided in turn. The provision of the travel route to a traveler is described in Metro One's co-pending application Ser. No. 09/054,360.

It is to be understood that the above description is only of the preferred embodiments of the invention. Numerous other arrangements may be devised by one skilled in the art without departing from the spirit and scope of the invention. The invention is thus limited only as defined in the accompanying claims.

What is claimed is:

1. A method for determining a current geographic location of a traveler where the traveler is capable of visually identifying one or more landmarks proximate to the current geographic location, the method comprising:
    establishing a communication link between the traveler and a service provider;
    receiving from the traveler a communication of a visual identification of the one or more landmarks proximate to the current geographic location, and information about a direction in which the traveler is heading;
    searching for the one or more landmarks visually identified by the traveler in a database having records corresponding to geographic location information for a plurality of landmarks in a given region;
    based on at least the information about the direction, identifying to the traveler a second landmark from the plurality of landmarks which is in proximity of the one or more landmarks; and
    determining the current geographic location and a heading direction of the traveler based on at least a confirmation by the traveler of the second landmark.

2. A method as in claim 1, further comprising audibly communicating to the traveler over the communication link the determined current geographic location.

3. A method as in claim 1, further comprising receiving from the traveler an indication of a destination of the traveler.

4. A method as in claim 3, further comprising determining a route from the determined current geographic location to a destination geographic location.

5. A method as in claim 4, further comprising audibly communicating to the traveler over the communication link at least a portion of the determined route.

6. A method as in claim 1, wherein the service provider includes a voice response system.

7. A method as in claim 6, wherein the voice response system includes interactive voice recognition capabilities.

8. A method as in claim 1, wherein the service provider includes a human operator.

9. A method as in claim 1, wherein the second landmark comprises a street sign.

10. A method as in claim 1, wherein the second landmark comprises retail signage.

11. A system for determining a current geographic location of a traveler where the traveler is capable of visually identifying one or more landmarks proximate to the current geographic location, the system comprising:
    one or more service providers;
    a plurality of inbound communication channels for receiving a communication from a traveler;
    a switch platform for directing a communication received from a traveler over one of the plurality of inbound communication channels to one of the one or more service providers, the communication containing a visual identification of the one or more landmarks proximate to the current geographic location and information about a direction in which the traveler is heading;
    a database having records corresponding to geographic location information for a plurality of landmarks in a given region;
    a processor for executing a search of the database for a second landmark from the plurality of landmarks, which is in proximity of the one or more landmarks based on at least the information about the direction the processor determining the current geographic location and a heading direction of the traveler based on at least a confirmation by the traveler of the second landmark.

12. A system as in claim 11, wherein the service provider audibly communicates to the traveler over one of the communication channels the determined current geographic location.

13. A system as in claim 11, wherein the service provider receives from the traveler over one of the communication channels an indication of a destination of the traveler.

14. A system as in claim 13, wherein the processor determines a route from the determined current geographic location to a destination geographic location.

15. A system as in claim 14, wherein the service provider audibly communicates to the traveler over one of the communication channels at least a portion of the determined route.

16. A system as in claim 11, wherein the service provider includes a voice response system.

17. A system as in claim 16, wherein the voice response system includes interactive voice response capabilities.

18. A system as in claim 11, wherein the service provider includes a human operator.

19. A system as in claim 11, wherein the second landmark comprises a street sign.

20. A system as in claim 11, wherein the second landmark comprises retail signage.

* * * * *